US009347778B2

(12) United States Patent
Davis et al.

(10) Patent No.: US 9,347,778 B2
(45) Date of Patent: May 24, 2016

(54) MANAGING DIFFERENCES BETWEEN GEOGRAPHIC DATABASE VERSIONS

(71) Applicant: Navteq B.V., Veldhoven (NL)

(72) Inventors: Joseph B. Davis, Chicago, IL (US); Michael A. Mulligan, Libertyville, IL (US)

(73) Assignee: HERE Global B.V., Veldhoven (NL)

( * ) Notice: Subject to any disclaimer, the term of this patent is extended or adjusted under 35 U.S.C. 154(b) by 177 days.

(21) Appl. No.: 13/949,871

(22) Filed: Jul. 24, 2013

(65) Prior Publication Data
US 2013/0311091 A1 Nov. 21, 2013

Related U.S. Application Data

(63) Continuation of application No. 11/966,133, filed on Dec. 28, 2007, now Pat. No. 8,521,430.

(51) Int. Cl.
G01C 21/00 (2006.01)
G01C 21/26 (2006.01)
G08G 1/0968 (2006.01)
G01C 21/32 (2006.01)
G06F 17/30 (2006.01)

(52) U.S. Cl.
CPC ............ G01C 21/26 (2013.01); G01C 21/32 (2013.01); G06F 17/30241 (2013.01); G08G 1/096811 (2013.01)

(58) Field of Classification Search
None
See application file for complete search history.

(56) References Cited

U.S. PATENT DOCUMENTS

| 5,363,473 A | 11/1994 | Stolfo et al. |
| 5,524,202 A | 6/1996 | Yokohama |
| 5,614,895 A | 3/1997 | Ohomori et al. |
| 5,684,989 A | 11/1997 | Nissato |
| 5,806,018 A | 9/1998 | Smith et al. |

(Continued)

FOREIGN PATENT DOCUMENTS

| CN | 1576795 A | 2/2005 |
| CN | 1909022 A | 2/2007 |

(Continued)

OTHER PUBLICATIONS

Bastiaensen E., et al.: "Actmap: Real-Time Map Updates for Advanced In-Vehicle Applications" Internet Publication [Online] Dec. 2003, Paper No. 2534 T, http://its-europe.org/download/actmap_public_documents/2_ActMap-Article-ITS-v1.2.pdf.

(Continued)

Primary Examiner — Thomas G Black
Assistant Examiner — Peter D Nolan
(74) Attorney, Agent, or Firm — Lempia Summerfield Katz LLC

(57) ABSTRACT

A method and system for managing differences between geographic database versions is disclosed. A user registers his version of a geographic database with a map management application and thereafter enters a destination on a graphical user interface. The map management application checks to see if data representing the destination is located in the user's version of the geographic database and a more current version of the geographic database. If the data representing the destination is located in the more current version but not the user's version of the geographic database, the map management application provides the user with options, including upgrading to a more current version of the geographic database.

18 Claims, 7 Drawing Sheets

(56) References Cited

U.S. PATENT DOCUMENTS

| | | | |
|---|---|---|---|
| 5,893,113 A | 4/1999 | McGrath et al. | |
| 5,951,620 A | 9/1999 | Ahrens et al. | |
| 5,974,419 A | 10/1999 | Ashby | |
| 6,037,942 A | 3/2000 | Millington | |
| 6,075,467 A | 6/2000 | Ninagawa | |
| 6,121,924 A | 9/2000 | Meek et al. | |
| 6,230,098 B1 | 5/2001 | Ando et al. | |
| 6,343,301 B1 | 1/2002 | Halt et al. | |
| 6,453,233 B1 | 9/2002 | Kato | |
| 6,487,495 B1 | 11/2002 | Gale et al. | |
| 6,542,816 B1 | 4/2003 | Ito et al. | |
| 6,546,334 B1 | 4/2003 | Fukuchi et al. | |
| 6,549,847 B2 | 4/2003 | Ikeuchi et al. | |
| 6,636,802 B1 | 10/2003 | Nakano et al. | |
| 6,704,649 B2 | 3/2004 | Miyahara | |
| 6,718,258 B1 | 4/2004 | Barton | |
| 6,766,248 B2 | 7/2004 | Miyahara | |
| 6,782,319 B1 | 8/2004 | McDonough | |
| 6,845,319 B2 | 1/2005 | Uchida | |
| 6,873,998 B1 | 3/2005 | Dorum et al. | |
| 6,879,838 B2 | 4/2005 | Rankin et al. | |
| 6,937,936 B2 | 8/2005 | Nimura | |
| 7,024,307 B2 | 4/2006 | Ito et al. | |
| 7,158,880 B2 | 1/2007 | Geiger et al. | |
| 7,317,986 B2 | 1/2008 | Kim | |
| 7,386,393 B2 | 6/2008 | Zabel et al. | |
| 7,480,567 B2 | 1/2009 | Suomela et al. | |
| 7,519,470 B2 | 4/2009 | Brasche et al. | |
| 7,711,473 B2 | 5/2010 | Sekine et al. | |
| 7,739,037 B2 | 6/2010 | Sumizawa et al. | |
| 7,769,541 B2 | 8/2010 | Watanabe | |
| 7,822,542 B2 | 10/2010 | Mitsugi | |
| 7,873,465 B2 | 1/2011 | Geelen et al. | |
| 7,890,255 B2 | 2/2011 | Ikeuchi et al. | |
| 2002/0029224 A1 | 3/2002 | Carlsson | |
| 2002/0128768 A1 | 9/2002 | Nakano et al. | |
| 2002/0156739 A1* | 10/2002 | Hirai et al. | 705/52 |
| 2003/0182052 A1 | 9/2003 | DeLorme et al. | |
| 2004/0002812 A1 | 1/2004 | Yamanaka | |
| 2004/0030490 A1 | 2/2004 | Hegedus et al. | |
| 2004/0054465 A1 | 3/2004 | Hamaguchi et al. | |
| 2004/0104842 A1 | 6/2004 | Drury et al. | |
| 2004/0122590 A1 | 6/2004 | Ito et al. | |
| 2004/0133343 A1 | 7/2004 | Hashida et al. | |
| 2004/0133344 A1 | 7/2004 | Hashida et al. | |
| 2005/0114018 A1 | 5/2005 | Umezu et al. | |
| 2006/0074547 A1 | 4/2006 | Kaufman et al. | |
| 2006/0080029 A1* | 4/2006 | Kodani et al. | 701/208 |
| 2006/0095202 A1 | 5/2006 | Atarashi et al. | |
| 2007/0126605 A1 | 6/2007 | Aleksic et al. | |
| 2007/0282521 A1 | 12/2007 | Broughton | |
| 2008/0046174 A1 | 2/2008 | Johnson | |
| 2008/0162041 A1* | 7/2008 | Nakamura | 701/209 |
| 2008/0208452 A1 | 8/2008 | Stocker | |
| 2008/0288165 A1 | 11/2008 | Suomela et al. | |
| 2010/0106397 A1 | 4/2010 | Van Essen | |
| 2010/0207751 A1 | 8/2010 | Follmer et al. | |

FOREIGN PATENT DOCUMENTS

| | | |
|---|---|---|
| CN | 101078633 A | 11/2007 |
| DE | 102006013354 | 9/2007 |
| DE | 102006013355 | 9/2007 |
| EA | EP1493992 A2 | 1/2005 |
| EP | 1464922 | 10/2004 |
| EP | 1715295 | 10/2006 |
| JP | 2004354149 | 12/2004 |
| JP | 2006171106 A | 6/2006 |
| WO | WO2008123769 | 10/2008 |

OTHER PUBLICATIONS

Bastiaensen E., et al.: "Specification of Actualization Strategies, Map Components Version Control and Interfaces" Internet Publication, [Online] Aug. 28, 2003, XP002391250, www.ertico.com/download/actmap_public_documents/2_065v11-D31-fnal.pdf.

Chinese Office Action for related application No. 200810184711.3, mailed Jan. 10, 2013.

CommonwebNews.com, TomTom Links GPS Devices to Google Maps, Dec. 5, 2007.

European Search Report for Application No. 08254020.4, dated Mar. 26, 2009.

MapQuest, MapQuest Enables Users to Send Maps and Directions to Cell Phones [Press Release], Mar. 26, 2007, http://search.proquest.com/docview/445066223/13BCE6935712B8B60F5/202?accountid=14753.

Mercedes-Benz, Home of Mercedes-Benz Luxury Automobiles, Frequently Asked Questions, [Online] Nov. 21, 2007, www.mbusa.com/navigation/trips/search-and-send/faq.do.

Seeaarch.com, Side by Side Comparison of Maps and Driving Directions, Dec. 21, 2007, http://directions.seeaarch.com/drivingdirections.htm.

Chinese Office action for related Chinese Application No. 201310563886.6, dated Dec. 23, 2015, with English Translation.

Chinese Search Report for related Chinese Application No. 2013105638866, dated Nov. 24, 2015.

* cited by examiner

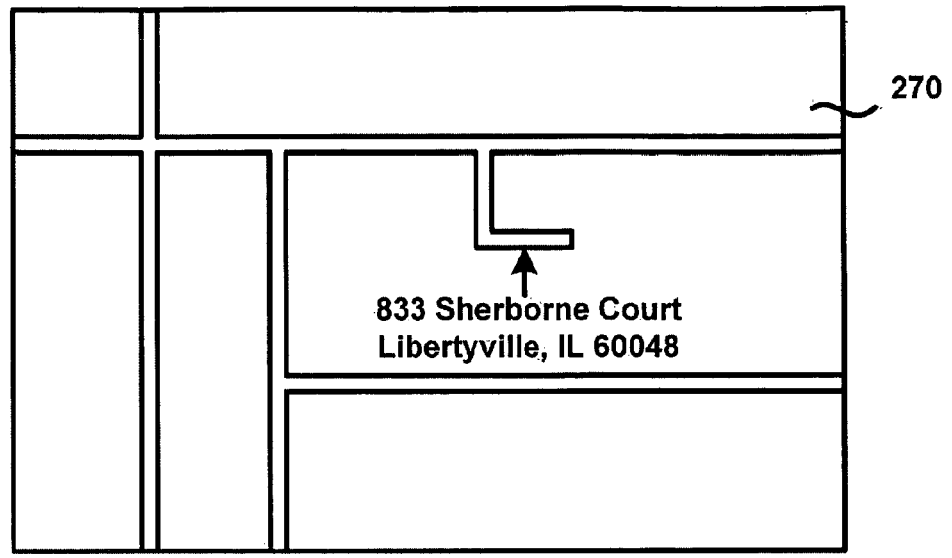
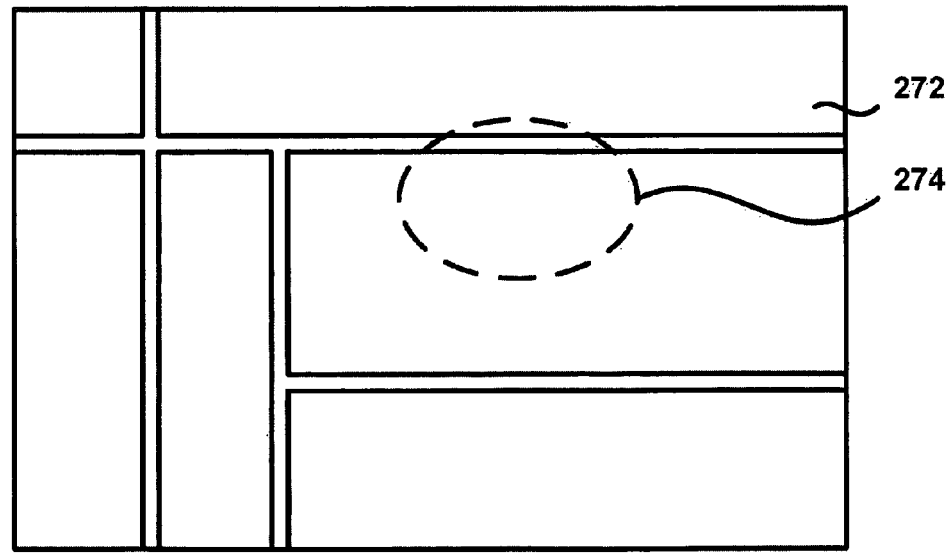
FIG. 5

The destination you entered is in the latest version of the map database, but not in your version. Please choose an option below.

☐ Print directions to the destination.

☐ Get me close to the destination, and print the remaining directions.

☐ Send directions to my mobile device.

☐ Provide the latitude and longitude.

☐ I do not need directions.

FIG. 6

This is the 4th address you have requested that is not in your car's map database. Would you like to purchase a more current version of the map database?

FIG. 7

MANAGING DIFFERENCES BETWEEN GEOGRAPHIC DATABASE VERSIONS

REFERENCE TO RELATED APPLICATIONS

This application is a continuation under 37 C.F.R. §1.53(b) and 35 U.S.C. §120 of U.S. patent application Ser. No. 11/966,133 filed Dec. 28, 2007, which is hereby incorporated by reference in its entirety.

FIELD

The present invention relates to a method and system for managing differences between geographic database versions, and more particularly to a method and system for providing notifications and options to a user based on data sets located in two different versions of the geographic database.

BACKGROUND

Navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route. The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. There is a need to gather and organize comprehensive, detailed, reliable, and up-to-date data about geographic regions. There is also a need to update the geographic data. Just like conventional printed maps, geographic data used in computer-based navigation systems can become out-of-date. For example, new roads are built, businesses change locations, road construction closes roads, detours are established, business hours change, and so on. Additionally, the accuracy of the geographic data may improve due to improved data collection techniques.

Updated versions of the geographic database are released more than once a year. For example, a geographic database update cycle may be quarterly or bi-annually, and this update cycle is expected to increase in frequency with technology improvements. However, the updated geographic database may not be available to all end users at the same time. Typically, a web-based mapping application receives and uses the updated geographic database before a navigation application located within a vehicle. In some cases, the updated geographic database for an in-vehicle navigation system may not be available for three or more years after a web-based mapping application uses the updated geographic database.

Newer device implementations can allow a user of a portable or an in-vehicle navigation system to access a web-based mapping application to select and then transfer a destination to their navigation system. This 'destination management' capability of connecting online mapping with a portable or in-vehicle navigation system addresses a primary area for improvement in all navigation devices, but also introduces the possibility for new types of errors. In this example, the destination information is transferred via a wireless connection or a portable media card and when the navigation system receiving the transferred destination does not have information regarding that destination, the potential for an error occurs such that the navigation system is unable to provide guidance to the destination. As a result, the user may become dissatisfied with his navigation system. Thus, it would beneficial to fulfill the expectations of the user so that the user enjoys using his navigation system and appreciates the convenience of the system.

Accordingly, a method and system are desired that would identify whether a navigation system is able to provide guidance to a destination and, if not, provide a user with options to solve the immediate need before encountering the before mentioned navigation device error. Further, there is a need for providing guidance to the user regarding when to obtain an updated geographic database.

SUMMARY

A method and system for managing differences between geographic database versions is disclosed. A user of a geographic database enters a destination into a map management application. The user may enter an address, geographic coordinates, point of interest information, or other information that identifies the destination. The map management application determines whether data representing the destination is located in a version of the geographic database that is more current than the user's version of the geographic database.

If the data representing the destination is not in the more current version of the geographic database, the map management application provides the user with an option to correct the spelling of the destination and, if there are no mistakes, the application provides a message to the user indicating that the destination is not located in the more current version of the geographic database. If the data representing the destination is located in the more current version of the geographic database, the map management application determines whether the data representing the destination is also located in the user's version of the geographic database.

If the data representing the destination is located in the user's version of the geographic database, the map management application provides a message to the user confirming that the destination is located in the user's version of the geographic database. The map management application may then forward the destination to the user's navigation system so that the user can select the destination when using his navigation system.

If the data representing the destination is located in the more current version of the geographic database, but not in the user's version of the geographic database, the map management application provides the user with options. One option allows the user to upgrade to a more current version of the geographic database. The map management application may provide the number of times that the user's geographic database has not included an entered destination so that the user can make an informed decision regarding whether to upgrade.

Another option is to use some geographic data in the more current version and some geographic data in the user's version of the geographic database. With this option, the user may obtain directions to a point near the destination using the user's version of the geographic database. The map management application provides guidance from that point to the destination using the more current version of the database. Other options are also available.

Additionally, the map management application provides notifications and/or options to the user when data representing the destination is located in the user's version of the geographic database, but not in the more current version of the geographic database. For example, a business may close and the user's version of the geographical database may still include information regarding the business. The user can use the map management application to eliminate a trip to a non-existent place.

The map management application improves the user's satisfaction with the destination entry process as the user knows whether or not his geographic database is suitable for reaching a desired destination and, if not, is provided with information and options for alternative courses of action. These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 5 shows differences between two maps generated from two different versions of a geographic database, according to an example;

FIG. 6 shows a message when a destination is not found in a user's geographic database, according to an example;

FIG. 7 shows a message when a destination is not found in a user's geographic database, according to another example.

DETAILED DESCRIPTION

I. Navigation System

Figure 1:
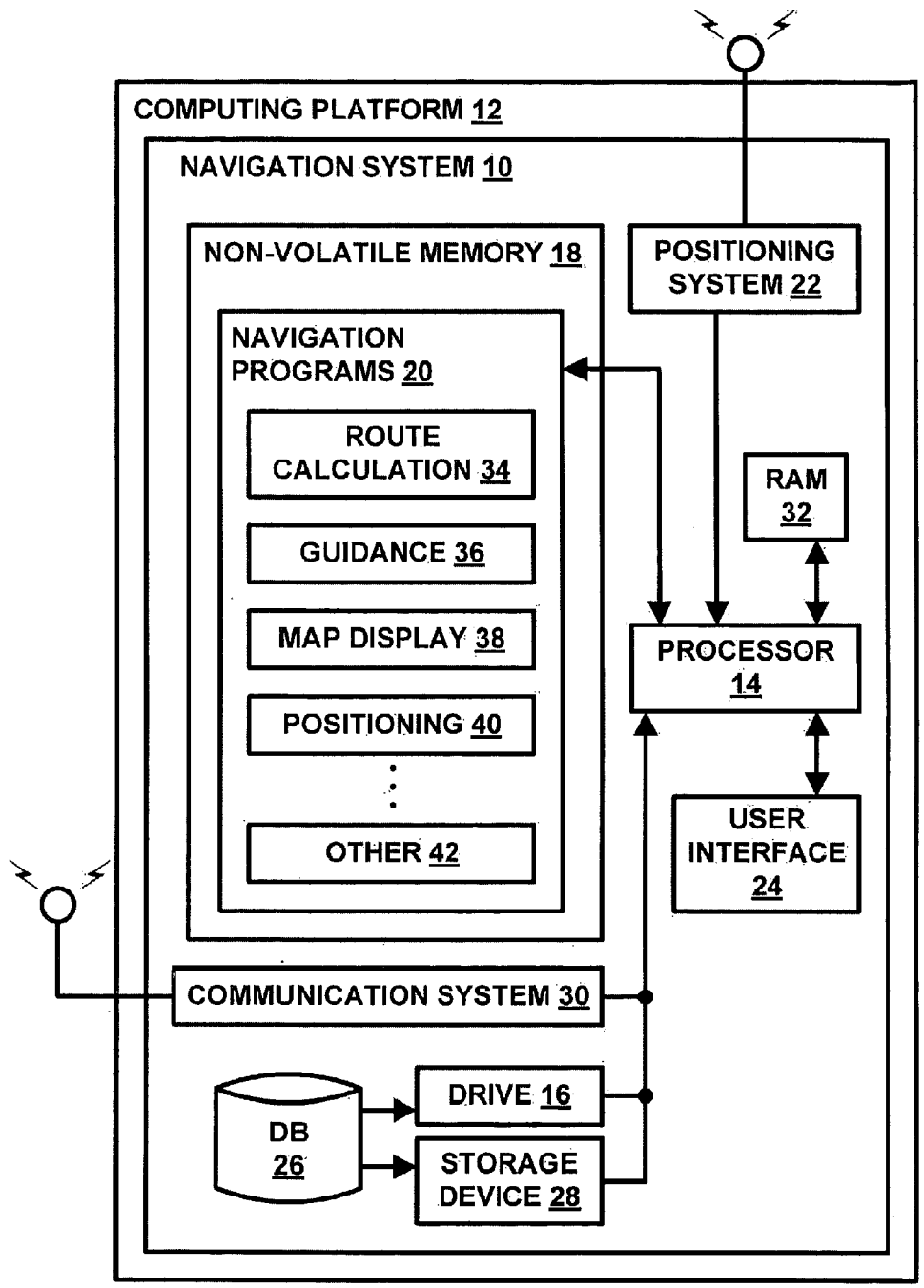
FIG. 1 is a block diagram of a navigation system, according to an example.

FIG. 1 is a block diagram of a navigation system 10 associated with a computing platform 12. The computing platform 12 may be associated with a vehicle. Additionally, the computing platform 12 may be a personal digital assistant (PDA), mobile telephone, personal computer, or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, all of which are known in the art. The positioning system 22 may include suitable sensing devices that measure the traveling distance speed, direction, orientation, and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26. In one embodiment, the geographic database 26 is stored on a storage medium, such as CD-ROM, DVD, or flash memory that is installed in the drive 16 so that the geographic database 26 can be read and used by the navigation system 10. In another embodiment, the geographic database 26 is stored on a hard drive. The navigation system 10 may also include a writable storage device 28, such as a hard disk or memory card, on which a portion of the geographic database 26 may be stored. In one embodiment, the geographic database 26 is a geographic database published by NAVTEQ North America, LLC of Chicago, Ill.

In one example, the navigation application software programs 20 load from the non-volatile memory storage device 18 into a random access memory (RAM) 32 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions. The navigation application software programs 20 may include separate applications (or subprograms) that provide the various navigation-related features and functions. The navigation functions and features may include route calculation 34 (wherein a route from an origin to a destination is determined), route guidance 36 (wherein detailed directions are provided for reaching a desired destination), map display 38, and positioning 40 (e.g., map matching). Other functions and programming 42 may be included in the navigation system 10.

The navigation application software programs 20 may be written in a suitable computer programming language, such as C, although other programming languages, such as C++ or Java, are also suitable. All of the components described above may be conventional (or other than conventional) and the manufacture and use of these components are known to those of skill in the art.

Just like conventional printed maps, geographic data in the geographic database 26 can become out-of-date. For example, new roads are built, businesses change locations, road construction closes roads, detours are established, museum and restaurant hours change, and so on. Additionally, the accuracy of the geographic data may improve due to improved data collection techniques. A geographic database provider may update a master geographic database on a regular basis to add new, previously not-known data to the database; remove of existing data from the database; and change the state of a known value to a new data value. The geographic database provider compiles the master geographic database several times a year to make updated versions of geographic database available to an end user.

II. Map Management Application

Figure 2:
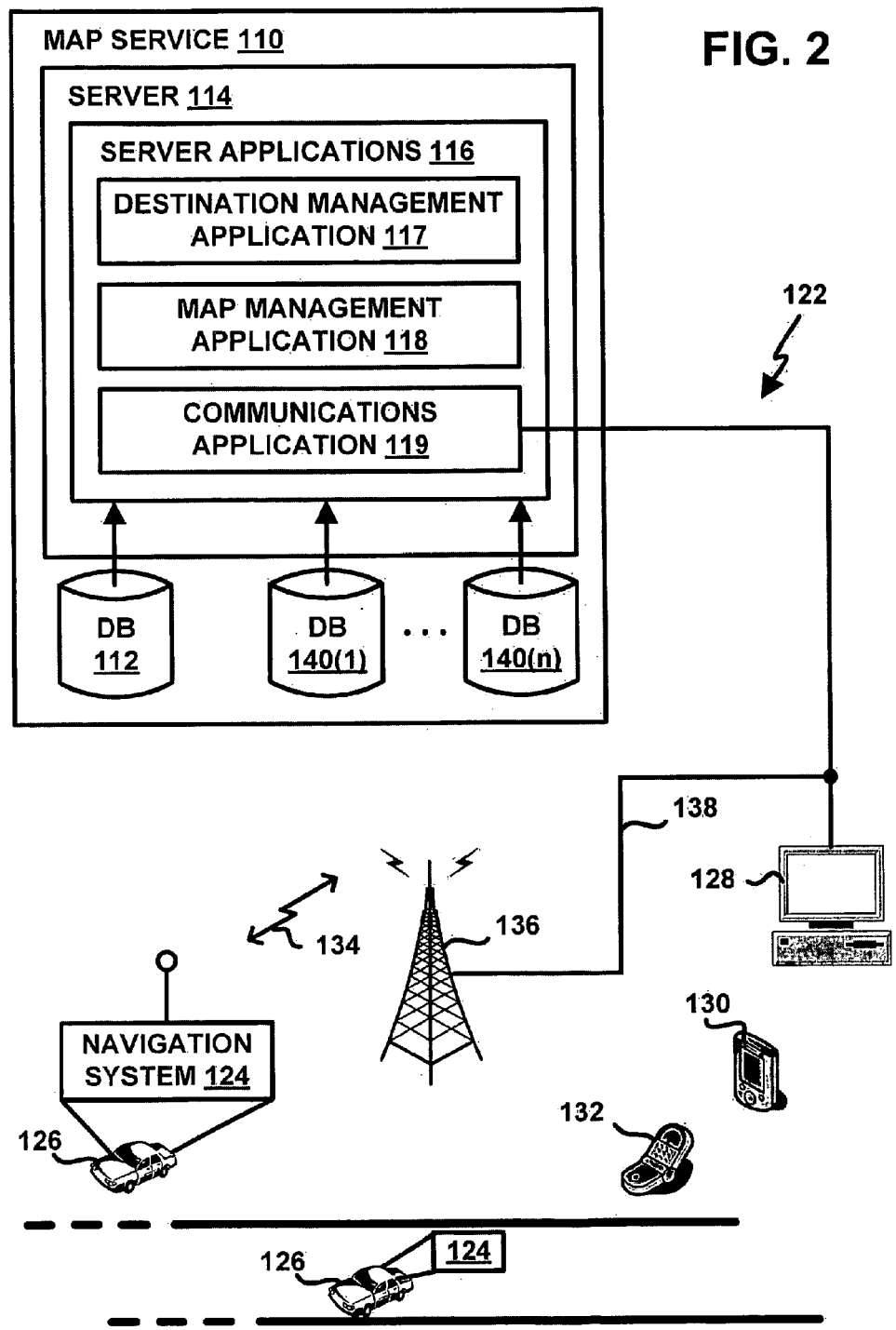
FIG. 2 is a block diagram of a system for managing differences between geographic database versions, according to an example.

FIG. 2 illustrates an example system for managing differences between geographic database versions. A map service 110 has access to a geographic database 112 that has been recently released by the geographic database provider. The map service 110 may be any entity having a web-based map site. The map service 110 obtains updates to the geographic database 112 on a regular basis, such as weekly, monthly, quarterly, or whenever a new version of the geographic database 112 becomes available. The geographic database 112 may be stored on one or more hard drive(s) or other storage media.

The map service 110 may have access to other versions 140 of the geographic database. The different versions 140 include versions of the geographic database released prior to the version of the geographic database 112, including the version of the geographic database 26. Additionally, the different versions 140 include versions compiled for different end users. For example, one set of geographic database versions 140 may include versions released for a particular car manufacturer. The versions 140 of the geographic database may also be stored on one or more hard drive(s) or other storage media.

Additionally or alternatively, the map service 110 may have access to data that indicates when data in the master geographic database was added, deleted, or changed. This temporal data may be located within the geographic database 112 or in another database. For example, a unique location reference identifier may be assigned to each location referenced in the master geographic database. A date and also possibly a time may be associated with the location reference identifier. The date (and possibly time) indicates the last time data associated with the location was changed.

A server 114 includes server applications 116 that may be stored on one or more hard drive(s) or other media operated by the server 114 and loaded into a memory of the server 114 to run. The server applications 116 include a destination management application 117, a map management application 118, and a communications application 119. The server applications 116 may include other software applications as well.

The destination management application 117 provides a graphical user interface on one or more web pages to receive information from and provide information to a user. The user specifies a destination via the user interface. The destination information may be an address, geographic coordinates of the destination, point of interest information, or other information. In response, the destination management application 117 may generate and cause a map to be displayed on the user interface depicting the location of the destination. The user can then request that the specified destination be sent to a user device, such as the user's navigation system, using the communications application 119.

The map management application 118 functions to manage differences between two versions of a geographic database. In one example, the first version of the geographic database is the geographic database 112 and the second version is one of the other released versions 140 of the geographic database. For example, the version 140($n$) of the geographic database may correspond to the geographic database 26. The geographic database 26 may not have the latest data sets and may not be able to provide guidance to new destinations or provide faulty guidance for destinations that have changed.

In another example, the first version of the geographic database is the geographic database 112 and the second version is the geographic database 26. The map management application 118 uses the temporal data associated with location reference identifiers to determine whether the data in the geographic database 26 is as current as the data in the geographic database 112 for a particular location.

The map management application 118 also provides a graphical user interface on one or more web pages to receive information from and provide information to a user. The user provides information regarding the version of the geographic database 26. For example, the geographic database 26 may be located on a disk (e.g., CD-ROM or DVD) that includes a serial number or other identification number that the user provides to the map management application 118 via the graphical user interface. As another example, the navigation system 10 may transmit the version information to the map service 110 via the communication system 30 and the communications application 119. This registration process may occur each time the user accesses the map management application 118. Alternatively, the map management application 118 may save the version information for the geographic database 26 in memory on the server 114.

Based on the destination information that the user provided to the destination management application 117, the map management application 118 manages differences between the data sets included in the geographic database 112 and the geographic database 26. Additionally, the map management application 118 tracks the number of times the geographic database 26 does not include data regarding a destination that is found in the geographic database 112. Further, the map management application 118 provides information and options to the user. The information and/or options may be provided to the user via the graphical user interface, via a printer or other output device, or transferred to the navigation system 10 or other device via a communications application 119 or other mechanism. The information and options provided to the user are further described with reference to FIGS. 3-8.

The communications application 119 interfaces with a communication link 122 in order to receive messages from and send messages to a plurality of end users. As seen in FIG. 2, several types of computing platforms operated by the end users may request and receive messages from the communications application 119. The end user computing platforms may include navigation systems 124 associated with vehicles 126, personal computers 128, personal organizers (e.g., PDAs, PalmPilot®-type devices) 130, wireless phones 132, or any other types of computing devices that have the appropriate hardware and software to access the map service 110 over the communication link 122.

The communication link 122 may use any suitable technology and/or protocols that are currently available, as well as technology and/or protocols that become available in the future. For example, the data network may use WAP, TCP/IP, etc. More than one protocol may be used by the communication link 122 with appropriate conversions. The communication link 122 may be part of, or connected to, the Internet.

A portion of the communication link 122 may include a wireless portion 134. The wireless portion 134 of the communication link 122 enables two-way communication between the mobile end user computing platforms and the map service 110, including between the various mobile end user computing platforms. The wireless portion 134 may be implemented by any suitable form of wireless communication, including cellular, PCS, satellite, FM, radio, Bluetooth®, other long and short range transmission technologies, or technologies that may be developed in the future.

The wireless portion 134 may include one or more transmitters 136, such as a transponder tower, an antenna tower, an FM tower, satellites, or other suitable means. The transmitters 136 include an appropriate communication link 138 to the communication link 122 and/or the map service 110. The communication link 138 may be land-based or may be wireless. The transmitters 136 include suitable technology that enables two-way communication between the map service 110 and the mobile end user computing platforms.

The communication link 122 is not required in all embodiments. As described as follows, removable media (e.g., a flash drive) may be used to transfer information from the map service 110 to navigation systems associated with the vehicles 126, personal organizers 130, wireless phones 132, or other types of devices.

III. Managing Differences Between Geographic Database Versions

As previously described, a geographic database provider releases updated geographic data sets on a regular basis. While the provider's master geographic database may be updated frequently, end-user applications that use the geographic data may receive updates less frequently. For example, a web-based application may receive an updated geographic database bi-annually, quarterly, or more often. As another example, car manufacturers may release updated geographic database CD-ROMs or DVDs for in-vehicle navigation systems as new car models are released or upgraded, typically once a year or less frequently. Car owners may or may not upgrade their navigation systems as new disks are released. As a result, a user's geographic database disk for an in-vehicle navigation system may be several years old. Older geographic databases may lack data regarding new roads, neighborhoods, and businesses, while including data regarding physical entities that no longer exist or that have changed over time. Additionally, a newer geographic database may have data that provides additional details regarding features represented in the older geographic database.

Figure 3:
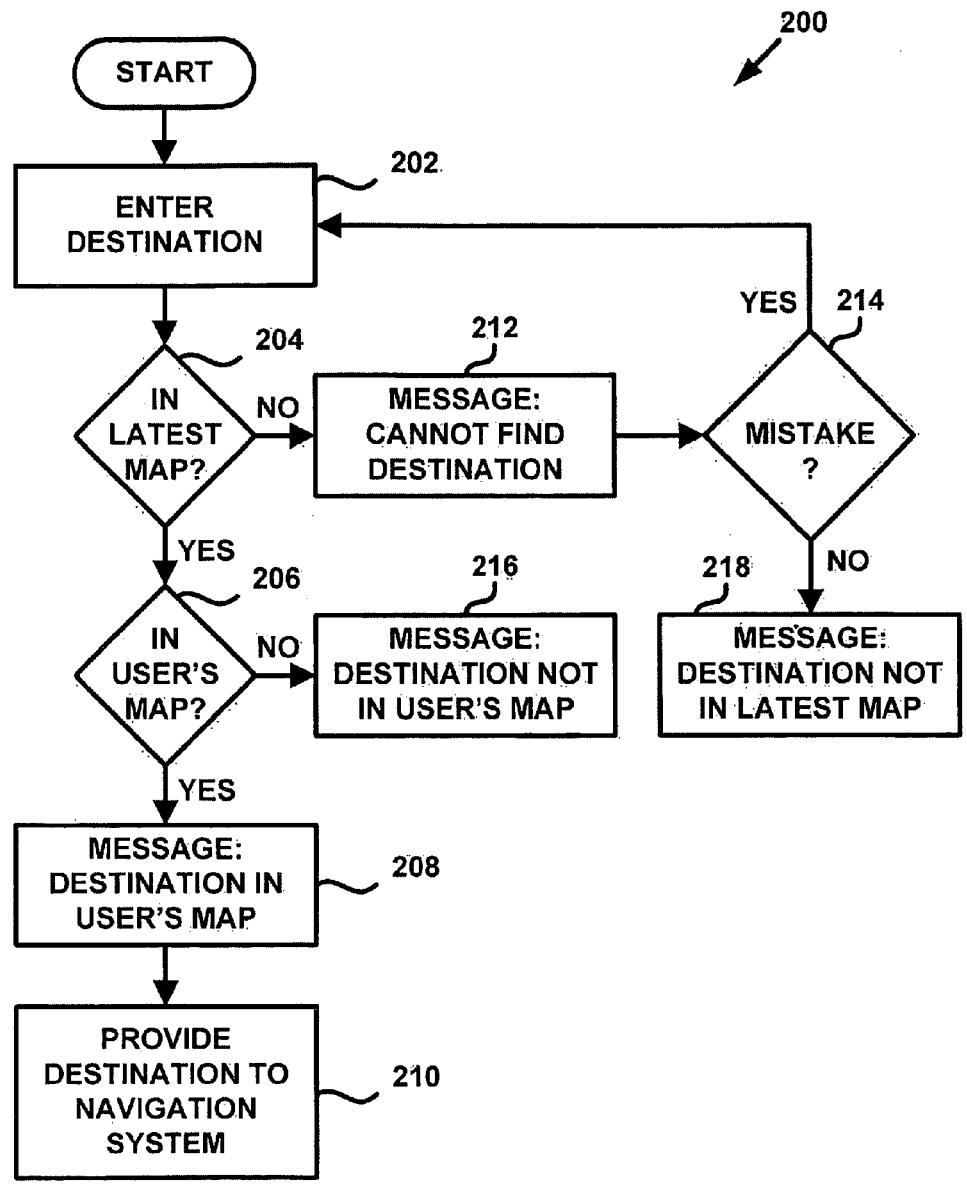
FIG. 3 is a flow chart of a process for managing differences between geographic database versions, according to an example.

FIG. 3 is a flow chart of a process 200 for managing differences between geographic database versions. Before traveling to a destination, a user of a navigation system may use the map management application 118 to determine whether the destination is located in the user's version of the geographic database.

Prior to starting the process 200, the user registers his geographic database version with the map management application 118. The registration process allows the map management application 118 to identify which version 140 of the geographic database to use when managing differences between the registered version and the geographic database 112. Alternatively, the registration process allows the map management application 118 to identify whether data associated with location reference identifiers has been modified since a particular version of the geographic database was released.

Registration may occur in any manner. For example, the map management application 118 may receive the version number after a user enters an identification number via a graphical user interface or after a navigation system transmits the identification number. The user may register his geographic database version once and the map management application 118 stores the information for future use. The user may also provide update registrations as the user purchases or otherwise obtains an updated version of the geographic database.

At block 202, the user enters a destination address. The map management application 118 determines whether the address is in a version of the geographic database referred to herein as the "latest" version of the geographic database (e.g., geographic database 112). While this version is referred to as the "latest" version of the geographic database, it is understood that the geographic database accessible to the map management application 118 may not have the most current geographic data. For example, the geographic database provider may have the most current version of the geographic database (i.e., the master geographic database) and the map management application 118 may access a geographic database that the provider released three or more months ago.

At block 204, the map management application 118 determines whether the address is in the latest version of the geographic database. If the entered address is not in the latest geographic database, at block 212 the map management application 118 displays a message to the user indicating that the address was not found in the latest version of the geographic database. At block 214, the map management application 118 then asks whether the user made a mistake entering the address. If the user did make a mistake entering the destination address, the user can enter the correct address at block 202.

If the user entered the address correctly, at block 218 the map management application 118 displays a message to the user indicating that the address is not available in the latest version of the geographic database. If the destination address is not located in the latest version of the geographic database, the map management application 118 and/or the user may provide the missing information to the geographic database provider so that the master geographic database can be updated as necessary.

In addition to or instead of receiving a message at block 218, the map management application 118 may determine whether the address is in the user's version of the geographic database. If the address is in the user's version of the geographic database but not in the latest version of the geographic database, data for the address may have been deleted because the address is no longer used. For example, a commercial area may have been converted to a park.

In this scenario, the map management application 118 may display a message to the user indicating that while the address is available in the user's version of the geographic database, the physical address may no longer exist. The map management application 118 may display one or more maps to the user so the user can see the difference between using two different versions of the geographic database. In addition, the map management application 118 may provide appropriate options to the user, such as receiving guidance based on the latest version of the geographic database.

Returning to block 204, if the map management application 118 determines that the address is in the latest version of the geographic database, the map management application 118 determines whether the address is also in the user's version of the geographic database. At block 206, if the map management application 118 determines that the user's version of the geographic database includes the address, the user receives a message at block 208 that the user's navigation system is capable of providing guidance to the user for the destination. Additionally, at block 210, the destination information may be transferred to the user's navigation system or other device via the destination management application 117 and the communications application 119, or by some other means. As a result, when the user activates his navigation system the address is already listed as a destination.

If at block 206 the user's version of the geographic database does not include the entered address, at block 216 the user receives a message that indicates that while the address is available in the latest version of the geographic database, the address is not available in the user's version of the geographic database. The map management application 118 may provide the user with options as described with reference to FIGS. 4-7.

Alternatively, the user's version of the geographic database may include the entered address, but not include additional details regarding features represented in the latest version of the geographic database. For example, the user's version of the geographic database may include the address of a shopping mall. However, the latest version of the geographic database not only has the address of the shopping mall, but also data for providing guidance to a parking garage for the mall, a particular mall entrance, to a store within the mall, or other location within the mall. When the user's version of the geographic database does not include these additional features, the map management application 118 may also provide the user with options as described with reference to FIGS. 4-7.

Figure 4:
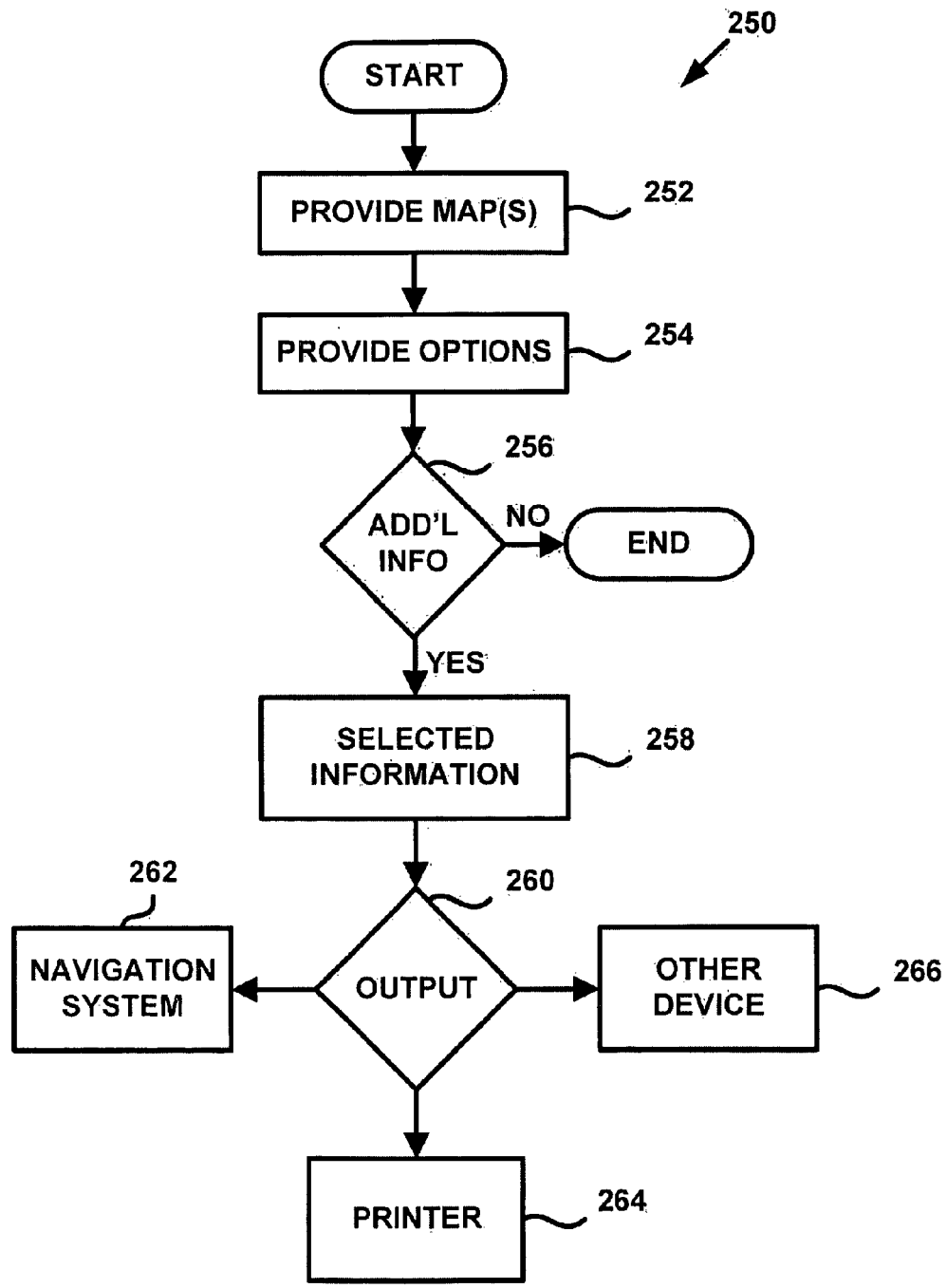
FIG. 4 is a flow chart of a process for providing options to the user of a navigation system, according to an example.

FIG. 4 is a flow chart of an example process 250 for providing options to the user of a navigation system when data representing a destination is located in the latest version of the geographic database, but not in the user's version. At block 252, the map management application 118 provides one or more maps to the user. As a result, the user can see the difference between using two different versions of the geographic database.

For example, the map management application 118 may display two maps adjacent to each other as depicted in FIG. 5. In this example, one map 270 shows the latest street network and the location of the entered destination, while the other map 272 shows the area 274 that was undeveloped when the older version of the geographic database was released. Alternatively, the map management application 118 may display a single map and highlight the missing road network that includes the location of the destination.

At block 254, the map management application 118 provides one or more options to the user. FIG. 6 depicts one example screen shot of options that may be presented to the user. As shown in FIG. 6, the user can request complete or partial directions to the destination using the data from the latest version of the geographic database. The map management application 118 uses the latest version of the geographic database to provide directions to the destination or to an alternative location in the user's version of the geographic database that is close to the destination.

The map management application 118 may print the directions obtained from using data from the latest version of the geographic database. Additionally or alternatively, the user can request that the directions be send to the user's mobile device, which may be a mobile telephone, a personal handheld device, or other mobile device. The user can also request that the map management application 118 provides the location close to the destination to the user's navigation system. This alternative location may be an address, a point of interest, or a geographic coordinate.

In another one of the options shown in FIG. 6, the user can request the geographic coordinates (e.g., latitude and longitude) of the entered destination using data from the latest version of the geographic database. The destination management application 117 provides the geographic coordinates to the user via the user's navigation system or other device. Alternatively, as shown in FIG. 6, the user can select the option to not receive directions.

FIG. 7 shows an additional and/or alternative message that can be provided to a user when data representing a destination is not available in the user's geographic database. In this example, the user is informed that this is the fourth time that the user's version of the geographic database did not have an entered destination. The message may also provide information regarding how to purchase or otherwise obtain a newer version of the geographic database. By knowing the number of times that the user's version of the geographic database has been unable to provide guidance to a desired destination, the user may make an informed decision regarding when to obtain a newer version of the geographic database.

While many options were discussed with respect to FIGS. 6 and 7, it is understood that other information and/or options may be provided to the user based on data representing a destination being located in the latest version of the geographic database but not in the user's version. For example, the user may be informed of the age or release date of the data in his geographic database (e.g., two years old). The user may use this information to determine whether to obtain a more current version of the geographic database.

At block 256, the map management application 118 determines whether the user has selected an option to receive information using the latest version of the geographic database. If not, the process 250 ends. Otherwise, at block 258, the map management application 118 determines what information the user has requested. For example, the user may request complete directions, partial directions, geographic coordinates, and/or an updated version of the geographic database.

At block 260, the map management application 118 determines how the requested information should be provided. FIG. 4 depicts three example output mechanisms as further described. However, the process 250 is not limited to any particular output mechanism.

At block 262, the destination management application 117 and the communications application 119 transfers the requested information to the user's navigation system. For example, the communications application 119 may transmit the information to the communication system 30 located on the navigation system 10. The transmission may occur over any combination of wired and wireless communication links and may be implemented by any suitable form of communication, including file transfer via flash card or other portable media, cellular, PCS, satellite, FM, radio, and Bluetooth® technologies.

At block 264, the map management application 118 transfers the requested information to a printer. The printer is connected to the computing platform that the user employs to access the map service 110. This connection may be a wired or wireless connection.

At block 266, the map management application 118 transfers the requested information to another device. For example, the information may be downloaded to a removable media device, such as a flash drive. The user can then manually load the information into his navigation system or other device, such as a mobile telephone or other personal handheld device. As another example, the information may be directly transferred to the mobile telephone and/or other personal handheld device via the communication application 119.

While the example in FIG. 3 described the user entering a destination address, the user may enter other destination information as well. For example, the user may enter the geographic coordinates of the destination. As another example, the user may enter point of interest information, such as a name of a business, airport, museum, or park. If the user enters point of interest information, the map management application 118 may also provide additional checks and information to the user as described with respect to FIG. 8.

Figure 8:
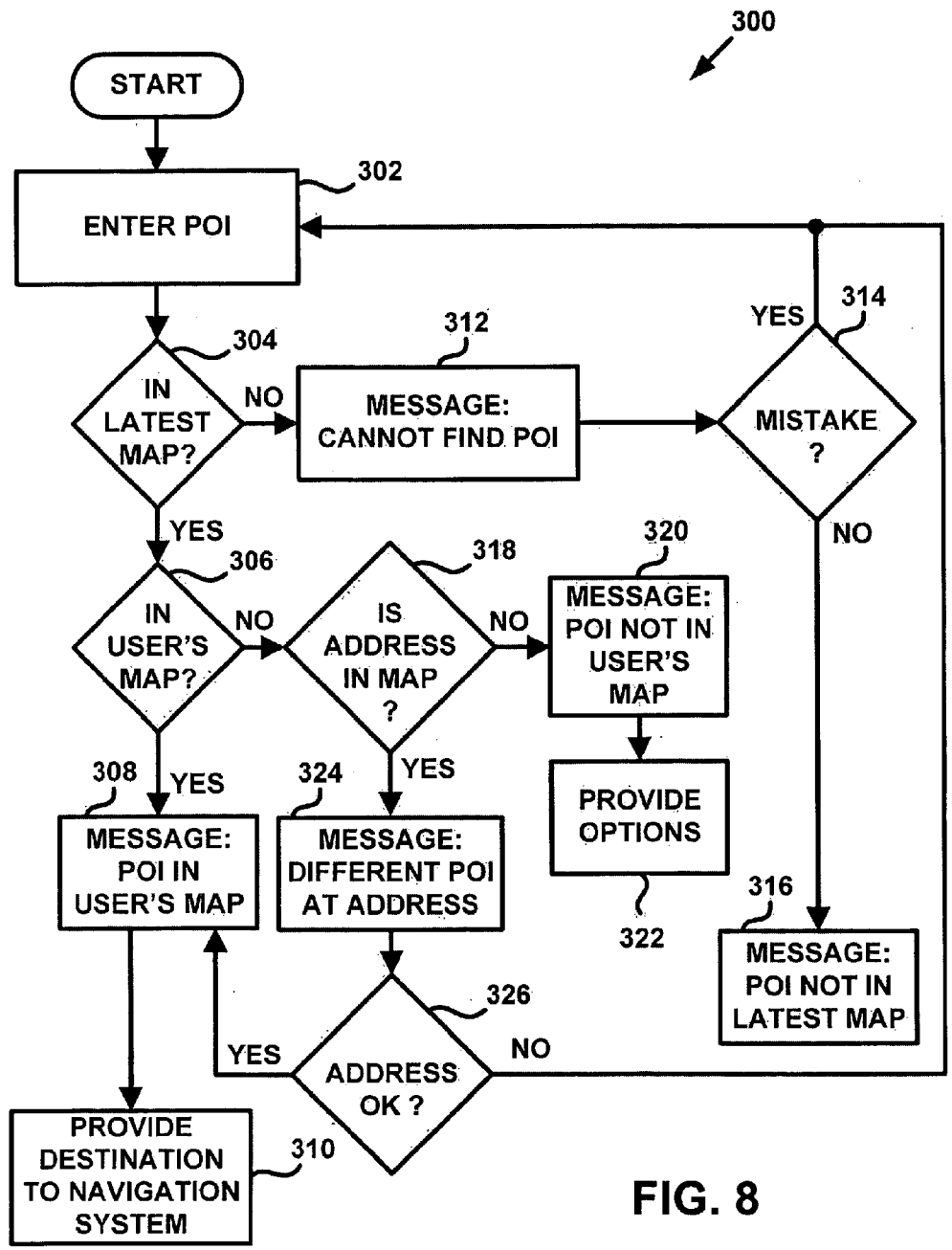
FIG. 8 is a flow chart of a process for managing differences between geographic database versions, according to another example.

FIG. 8 is a flow chart of a process 300 for managing differences between geographic database versions, according to another example. The process 300 is similar to the process 200. However, in the process 300, the user enters point of interest information as the destination. Prior to starting the process 300, the user registers his geographic database version as previously described.

At block 302, the user enters point of interest information. The map management application 118 compares the point of interest information to the latest version of the geographic database. At block 304, the map management application 118 determines whether data representing the point of interest is in the latest version of the geographic database.

If the entered point of interest information is not in the latest version of the geographic database, at block 312, the map management application 118 displays a message to the user indicating that the point of interest information was not found in the latest version of the geographic database. At block 314, the map management application 118 then asks whether the user made a mistake entering the point of interest information. If the user did make a mistake entering the point of interest information, the user can enter the correct point of interest information at block 302.

If the user entered the point of interest information correctly, at block 316 the map management application 118 displays a message to the user indicating that the point of interest information is not available in the latest version of the geographic database. If the point of interest information is not located in the latest version of the geographic database, the map management application 118 and/or the user may provide the missing information to the geographic database provider so that the master geographic database can be updated as necessary.

In addition to or instead of receiving a message at block 316, the map management application 118 may determine whether the point of interest information is in the user's version of the geographic database. If the point of interest information is in the user's version of the geographic database but not in the latest version of the geographic database, data for the point of interest may have been deleted because the point of interest does not exist anymore. For example, a corner store may have been converted to a parking lot.

In this scenario, the map management application 118 may display a message to the user indicating that while the point of interest information is available in the user's version of the geographic database, the point of interest may no longer exist. The map management application 118 may display one or more maps to the user so the user can see the difference between using two different versions of the geographic database. In addition, the map management application 118 may provide appropriate options to the user, such as receiving guidance based on the latest version of the geographic database Returning to block 304, if the map management application 118 determines that data representing the point of interest is in the latest version of the geographic database, the map management application 118 determines if data representing the point of interest is also in the user's version. At block 306, if the map management application 118 determines that the user's version of the geographic database includes the data representing the point of interest, the user receives a message at block 308 confirming that the user's in-vehicle navigation system is capable of providing guidance to the user for the point of interest. Additionally, at block 310, the point of interest information may be transferred to the user's navigation system or other device via the destination management application 117 and the communications application 119, or by other means. As a result, when the user activates his navigation system, the point of interest information is available as a destination.

If at block 306 the user's version of the geographic database does not include data representing the entered point of interest, at block 318, the map management application 118 determines whether the address of the point of interest is in the user's version of the geographic database. If the address of the point of interest is in the user's version of the geographic database, then, at block 324, the map management application 118 provides a message to the user indicating that while the entered point of interest is not located in the user's geographic database, the address of the point of interest is located in the user's geographic database. The message may also provide an indication of what point of interest is associated with the address.

For example, the user may have entered point of interest information for a gasoline station. However, the gasoline station has been replaced with a drug store. The latest version of the geographic database has data associated with the drug store at that address, while the user's version of the geographic database has data associated with the gasoline station at the same address.

At block 326, the map management application 118 asks the user whether the address information is sufficient for the user's purposes. If the address is sufficient to the user, the map management application 118 provides a message at block 308 that the user's navigation system is capable of providing guidance to the user for the address. Additionally, at block 310, the address may be transferred to the user's navigation system or other device. As a result, when the user activates the navigation system, the address is already listed as a destination. If the address is not sufficient to the user (e.g., the user needs to travel to a gasoline station), then the user can enter different point of interest information at block 302.

Returning back to block 318, if the address is not located in the user's version of the geographic database, at block 320, the map management application 118 provides a message to the user that indicates that while the point of interest information is available in the latest version of the geographic database, the point of interest information is not available in the user's version of the geographic database.

At block 322, the map management application 118 may provide the user with maps and/or options as shown and described with reference to FIGS. 4-7. Additionally, the map management application 118 may provide these maps and/or options when the user's version of the geographic database includes data representing the point of interest and/or the address, but the latest version of the geographic database has additional data regarding the point of interest and/or the address. The map management application may use this additional data to provide navigation guidance (e.g., a map, routing) to the user via the user's navigation system, a printer, or any other device, such as a mobile telephone, a personal handheld device, or a removable media device.

IV. Example

A user purchased a car two years ago. The car has an in-vehicle navigation system. The geographic database disk that came with the car has data that is now three years old. The user logs onto his personal computer and retrieves his emails via a web server. One of the user's emails is an invitation to a house warming party at his friend's house. The user's friend just bought a house in a new neighborhood, which was developed on a former farm field.

While still connected to the web server, the user enters a web-page address of the map service 110. For example, the web-page may be associated with the car manufacturer of the user's car. The user previously registered his geographic database disk with the map management application 118 so the application "knows" what version of the geographic database that the user's in-vehicle navigation system uses.

The user enters the address of his friend's new house into the destination field of a screen provided by the destination management application 117. The map management application 118 checks the address against a geographic database that is more current than the user's version of the geographic database.

In one scenario, the map management application 118 does not find the address in the latest geographic database. The map management application 118 displays an appropriate message to the user. For example, the message may state: "I cannot find the address you entered. Did you enter the address correctly?" The message screen may also provide an interface that allows the user to convey to the map management application 118 whether or not the address was entered correctly. For example, the map management application 118 may display check boxes for the user to make a selection.

If the user indicates that the address was entered incorrectly, the map management application 118 may re-display the destination screen so the user can enter a correct address. Otherwise, the map management application 118 displays an appropriate message to the user. For example, the message may state: "The address you entered is not in the latest version of the geographic database. If you would like to notify the map company of the missing address, please go to www.mapreporter.com."

In this example, the user simply misspelled the address. After entering the correct address, the map management application 118 checks the address against the latest version of the geographic database. This time, the map management application 118 finds the address in the latest version of the geographic database. The map management application 118 then checks the address against the user's version of the geographic database.

In one scenario, the map management application 118 does find the address in the user's version of the geographic database. The map management application 118 displays an appropriate message to the user. For example, the message may state: "The address you entered is in your version of the geographic database. The address has been transferred to your in-vehicle navigation system for your convenience." Later, the user can select this address from a menu on his in-vehicle navigation system when he is ready to travel to his friend's house.

However, in this example, the friend's house was built after the user purchased his car and the user has not updated the geographic database disk that came with his car's in-vehicle navigation system. The map management application 118 displays an appropriate message to the user. For example, the message may state: "The address you entered is in the latest version of the geographic database, but not in your version."

The map management application 118 provides the user with several options, which includes doing nothing, downloading directions for just the portion of the geographic database missing from the user's version of the map, downloading directions for the complete trip, and receiving the geographic coordinates (e.g., latitude and longitude) of his friend's house. The user may select an option after reviewing one or more displayed maps. For example, if the change is minor, the user may not need any additional guidance from the map management application 118. As another example, the new development may be large and complex, which may cause the user to request guidance for the portion of data missing from the user's version of the geographic database.

Additionally, the map management application 118 may provide the user with an indication of how many times that the user has requested an address that is available in the latest version of the geographic database, but not in the user's version. Additionally and/or alternatively, the map management application 118 may provide the user information regarding the age of the user's version of the geographic database. Depending on the number of times this situation has occurred and/or the age of the geographic database, the map management application 118 may provide the user with an option to purchase the latest version of the geographic database that is compatible with his vehicle. The map management application 118 may also provide the user with the option to receive a reminder at a later time.

In this example, the user selects the option to be routed to the nearest intersection in his geographic database and receive a print out for the remaining directions. The map management application 118 causes the intersection information to be transferred to the user's in-vehicle navigation system and causes the remaining directions to be printed by a printer connected to the user's personal computer.

The user also wants to purchase a house warming gift on the way to his friend's house. He knows there is a wine store nearby, but does not know the address of the store. The user enters the name of the wine store and the name of the city. The map management application 118 compares this entered point of interest information to the latest version of the geographic database. If the map management application 118 does not find data representing the point of interest in the latest version of the geographic database, the application 118 displays an appropriate message to the user. For example, the message may state: "I cannot find the destination you entered. Did you enter the destination information correctly?" The message may also provide an interface that allows the user to convey to the map management application 118 whether or not the point of interest information was entered correctly. For example, the map management application 118 may display check boxes for the user to make a selection.

If the user indicates that the destination information was entered incorrectly, the map management application 118 may re-display the destination screen so that the user can enter correct point of interest information. Otherwise, the map management application 118 displays an appropriate message to the user. For example, the message may state: "The destination you entered is not in the latest version of the geographic database. If you would like to notify the map company of the missing destination, please go to www.mapreporter.com."

In this example, the map management application 118 finds data representing the point of interest in the latest geographic database and then determines whether the user's version of the geographic database also includes the point of interest data. The user's version of the geographic database does not include the point of interest data, so the map management application 118 determines whether the user's version of the geographic database includes the address that the latest version of the geographic database associates with the point of interest. If the map management application 118 does not find the address, the application displays an appropriate message indicating that the point of interest is not in the user's version of the geographic database. The map management application 118 may provide options to the user similar to those described when an address was not in the user's version of the database.

However, in this example, the map management application 118 finds that the address associated with the wine store in the latest version of the geographic database is associated with a hardware store in the user's version of the geographic database. The map management application 118 displays an appropriate message to the user. For example, the message may state: "The destination you entered is associated with the address of Jack's Hardware Store. Would you like to go to this address or search again?" In this example, the user selects going to the address as he remembers that Jack's Hardware Store closed a year ago and the building is now being used as a wine shop. The map management application 118 causes the address of the now-defunct hardware store to be transferred to the user's in-vehicle navigation system. Later, the user can select this address from a menu on his in-vehicle navigation system when he is ready to travel to the wine store.

V. Conclusion

As described above, the map management application 118 provides information and options to a user of a navigation system that helps to optimize the 'destination management' applications that can be implemented as an online compliment to portable or in-vehicle navigation systems. Before the user starts a trip, the user can discover whether his version of a geographic database has data to support navigation to his destination. If the user's version of the database does not support the selected destination, the user can use data from a more current version of the database. Moreover, the user can receive a count of the number of times his version of the database has been unable to provide guidance, which may be used to make a reasoned decision regarding when to purchase or otherwise obtain a newer version of the geographic database. As a result, the user has a positive destination entry experience as he has the information he needs to reach his destination and to determine how often to upgrade.

While the example above described the user accessing a web page from a personal computer, it is understood that the user can access the Internet from a variety of devices, such as mobile telephones and other personal handheld devices. The example also described that the map management application 118 was accessible from a car manufacturer's web page; however, the map management application 118 may be accessible from a variety of web portals that may or may not be associated with other companies and/or services, or from installed software on the user's device. Additionally, the example described the user having an in-vehicle navigation system; however, it is understood that the user's navigation system may be located on any of a variety of computing platforms. For example, the user's navigation system may be located on a mobile telephone or other personal handheld device.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
registering an identifier for a navigation application at a map management server;
accessing an installed version, at the map management server, of a geographic database according to the identifier;
accessing a later version, at the map management server, of the geographic database, wherein the later version of the geographic database is different than the installed version of the geographic database;
receiving, at the map management server, a destination location;
querying the installed version of the geographic database for the destination location for a first map result;
querying the later version of the geographic database for the destination location for a second map result;
performing a comparison of the first map result and the second map result; and
generating a map showing one or more differences between the installed version of the geographic database and the later version of the geographic database.

2. The method of claim 1, further comprising:
displaying a result of the comparison of the first map result and the second map result.

3. The method of claim 1, wherein the comparison indicates that the destination location is included in the later version of the geographic database and omitted from the installed version of the geographic database.

4. The method of claim 1, further comprising:
counting a number of times destination locations are omitted from the installed version of the geographic database; and
displaying the number in a message to a user.

5. The method of claim 4, wherein the message includes an offer to purchase the later version of the geographic database.

6. The method of claim 1, further comprising:
determining a location included in the installed version of the geographic database and nearby to the second map result from the later version of the geographic database.

7. The method of claim 1, further comprising:
transmitting the navigation location to a navigation system including the navigation application when the first map result is substantially equivalent to the second map result.

8. A method comprising:
registering an identifier for a navigation application at a map management server;
accessing an installed version, at the map management server, of a geographic database according to the identifier;
accessing a later version, at the map management server, of the geographic database, wherein the later version of the geographic database is different than the installed version of the geographic database;

receiving, at the map management server, a destination location;

querying the installed version of the geographic database for the destination location for a first map result;

querying the later version of the geographic database for the destination location for a second map result; and performing a comparison of the first map result and the second map result;

providing a plurality of navigation options when the comparison of the first map result and the second map result indicates that the destination location is omitted from the installed version of the navigation database;

wherein the plurality of options includes at least two of a printout of full directions to the destination location, a printout of partial directions to the destination location based on the installed version of the geographic database, a transmission of directions to a mobile device, and a display of longitude and latitude coordinates.

9. An map management server comprising:

a processor configured to register a navigation application of a user at the map management server and receive a destination location entered from a website;

a first database including an installed version of a geographic database, wherein the installed version of the geographic database is installed with the navigation application of the user;

a second database including a later version of the geographic database, wherein the later version of the geographic database is newer than the installed version of the geographic database, wherein the processor is configured to query the installed version of the geographic database for the destination location for a first map result, query the later version of the geographic database for the destination location for a second map result, and perform a comparison of the first map result and the second map result;

wherein the processor is configured to generate a map showing one or more differences between the installed version of the geographic database and the later version of the geographic database.

10. The map management server of claim 9, further comprising:

generating a display message based on the comparison of the first map result and the second map result, wherein the display message indicates that the destination location is included in the later version of the geographic database and omitted from the installed version of the geographic database.

11. The map management server of claim 9, wherein the processor is further configured to count a number of times that destination locations are omitted from the installed version of the geographic database and generate an offer message when the number exceeds a threshold.

12. The map management server of claim 9, wherein the processor is configured to generate a navigation message when the comparison of the first map result and the second map result indicates that the destination location is omitted form the installed version of the navigation database.

13. The map management server of claim 12, wherein the navigation message includes options for a printout of full directions to the destination location, a printout of partial directions to the destination location based on the installed version of the geographic database, a transmission of directions to a mobile device, or a display of longitude and latitude coordinates.

14. The map management server of claim 12, further comprising:

a communication application configured to transmit the navigation location to the navigation application when the first map result is substantially equivalent to the second map result.

15. A non-transitory computer readable medium including instructions that when executed by a processor, instruct the processor to:

select an installed version of a geographic database installed with a navigation application from a list of compiled databases indexed by user;

select a later version of the geographic database from a map service;

receive, at a map management server, a destination location;

compare, with respect to the destination location, the installed version of the geographic database to the later version of the geographic database; and generate a message for a user of the navigation application based on the comparison, wherein the message includes maps showing differences between the installed version of the geographic database and the later version of the geographic database.

16. The non-transitory computer readable medium of claim 15, wherein the message includes an offer to update the installed version of the geographic database to the later version of the geographic database.

17. The non-transitory computer readable medium of claim 15, wherein the message includes options for printing directions to the destination location in response to the destination location being omitted from the installed version of the geographic database.

18. The non-transitory computer readable medium of claim 15, wherein the message indicates that the destination is invalid when the destination location is included in the installed version of the geographic database and omitted in the later version of the geographic database.

* * * * *